US012357026B2

(12) United States Patent
Moloney

(10) Patent No.: US 12,357,026 B2
(45) Date of Patent: Jul. 15, 2025

(54) HEATER FOR A VAPOR PROVISION SYSTEM

(71) Applicant: Nicoventures Trading Limited, London (GB)

(72) Inventor: Patrick Moloney, London (GB)

(73) Assignee: Nicoventures Trading Limited, London (GB)

( * ) Notice: Subject to any disclaimer, the term of this patent is extended or adjusted under 35 U.S.C. 154(b) by 478 days.

(21) Appl. No.: 17/439,787

(22) PCT Filed: Mar. 11, 2020

(86) PCT No.: PCT/GB2020/050589
§ 371 (c)(1),
(2) Date: Sep. 15, 2021

(87) PCT Pub. No.: WO2020/188247
PCT Pub. Date: Sep. 24, 2020

(65) Prior Publication Data

US 2022/0167672 A1 Jun. 2, 2022

(30) Foreign Application Priority Data

Mar. 15, 2019 (GB) ...................................... 1903536

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/465* (2020.01);
(Continued)

(58) Field of Classification Search
CPC .......... A24F 40/46; A24F 40/10; A24F 40/44; A24F 40/465; A24F 40/40; A24F 40/42;
(Continued)

(56) References Cited

U.S. PATENT DOCUMENTS 5,665,262 A 9/1997 Hajaligol et al.
9,289,014 B2 3/2016 Tucker et al.
(Continued)

FOREIGN PATENT DOCUMENTS

AU 2020244254 B2 9/2022
CN 205585316 U 9/2016
(Continued)

OTHER PUBLICATIONS

"Decision of Grant received for Russian Patent Application No. 2021126967/03, dated Jun. 2, 2023", 10 pages. (Official Copy Only).

(Continued)

*Primary Examiner* — Justin M Kratt
(74) *Attorney, Agent, or Firm* — Merchant & Gould P.C.

(57) ABSTRACT

A heater for vaporizing aerosolizable substrate material in an electronic vapor provision system has an elongate format and is formed from a planar element of electrically resistive material having a length, a width, and two pairs of opposite edges comprising two major edges substantially parallel to the length and two minor edges substantially parallel to the width, wherein the planar element is curved to form the elongate format of the heater such that the edges of one of the pairs of opposite edges are located adjacent one another and the curved planar element defines a volume to accommodate a porous material for wicking aerosolizable substrate material to the heater.

20 Claims, 7 Drawing Sheets

(51) Int. Cl.

| | |
|---|---|
| ***A24F 40/44*** | (2020.01) |
| ***A24F 40/465*** | (2020.01) |
| ***H05B 3/40*** | (2006.01) |
| ***H05B 3/42*** | (2006.01) |
| ***H05B 3/72*** | (2006.01) |
| ***H05B 6/10*** | (2006.01) |
| *A24F 40/40* | (2020.01) |
| *A24F 40/42* | (2020.01) |
| *A24F 40/50* | (2020.01) |
| *H05B 3/70* | (2006.01) |
| *H05B 3/74* | (2006.01) |

(52) U.S. Cl.

CPC ................. *H05B 3/40* (2013.01); *H05B 3/42* (2013.01); *H05B 3/72* (2013.01); *H05B 6/105* (2013.01); *A24F 40/40* (2020.01); *A24F 40/42* (2020.01); *A24F 40/50* (2020.01); *H05B 3/70* (2013.01); *H05B 3/748* (2013.01); *H05B 6/108* (2013.01)

(58) Field of Classification Search

CPC .. A24F 40/50; H05B 3/40; H05B 3/42; H05B 3/72; H05B 6/105; H05B 3/70; H05B 3/748; H05B 6/108

See application file for complete search history.

(56) References Cited

U.S. PATENT DOCUMENTS

| | | | | |
|---|---|---|---|---|
| 2011/0155153 | A1 | 6/2011 | Thorens et al. | |
| 2016/0219936 | A1 | 8/2016 | Alarcon | |
| 2017/0055581 | A1 * | 3/2017 | Wilke ...................... | A24C 5/01 |
| 2017/0119049 | A1 | 5/2017 | Blandino et al. | |
| 2017/0202266 | A1 | 7/2017 | Sur | |
| 2017/0251729 | A1 | 9/2017 | Li et al. | |
| 2017/0273354 | A1 | 9/2017 | Tucker et al. | |
| 2018/0132531 | A1 | 5/2018 | Sur et al. | |
| 2018/0192700 | A1 | 7/2018 | Fraser et al. | |

FOREIGN PATENT DOCUMENTS

| | | | | | |
|---|---|---|---|---|---|
| CN | 107708452 | A | | 2/2018 | |
| EA | 000244 | B1 | | 2/1999 | |
| GB | 2032271 | A | * | 5/1980 | ............... A45D 1/04 |
| JP | 2018528764 | A | | 10/2018 | |
| KR | 20180037019 | A | | 4/2018 | |
| RU | 2015139069 | A | | 4/2017 | |
| RU | 2017130917 | A | | 3/2019 | |
| WO | WO-2013083631 | A1 | * | 6/2013 | ............... A24D 3/17 |
| WO | 2014177862 | A1 | | 11/2014 | |
| WO | 2016075436 | A1 | | 5/2016 | |
| WO | WO-2016079155 | A1 | * | 5/2016 | ............. A24F 40/40 |
| WO | 2016156509 | A1 | | 10/2016 | |
| WO | WO-2016154792 | A1 | * | 10/2016 | ............. A24F 47/00 |
| WO | 2018019485 | A1 | | 2/2018 | |
| WO | 2019073010 | A1 | | 4/2019 | |
| WO | 2019224078 | A1 | | 11/2019 | |

OTHER PUBLICATIONS

"International Preliminary Report on Patentability received for PCT Patent Application No. PCT/GB2020/050589, mailed on Sep. 30, 2021", 11 pages.

"International Search Report and Written Opinion received for PCT Patent Application No. PCT/GB2020/050589, mailed on Jun. 4, 2020", 16 pages.

"Notice of Reasons for Refusal for Japanese Patent Application No. 2021-551536, mailed on Oct. 25, 2022", 11 pages (6 pages of English Translation and 5 pages of Official Copy).

"Office Action Received for Canadian Patent Application No. 3,132,116, mailed on Jun. 16, 2023", 3 pages.

"Notice of Allowance received for Chinese Patent Application No. 202080021210.2, mailed on May 27, 2024", 7 pages (2 pages of English Translation and 5 pages of Official Copy).

European Patent Office; European Office Action; Application No. 20 712 640.0; dated Mar. 13, 2025; 7 pgs.

* cited by examiner

HEATER FOR A VAPOR PROVISION SYSTEM

CROSS-REFERENCE TO RELATED APPLICATIONS

This application is a National Phase entry of PCT Application No. PCT/GB2020/050589, filed Mar. 11, 2020, which application claims the benefit of priority to GB Application No. 1903536.5, filed Mar. 15, 2019, the entire disclosures of which are incorporated herein by reference.

TECHNICAL FIELD

The present disclosure relates to a heater for a vapor provision system, and an atomizer, a cartomizer, or a cartridge and a vapor provision system comprising such a heater.

BACKGROUND

Many electronic vapor provision systems, such as e-cigarettes and other electronic nicotine delivery systems that deliver nicotine via vaporized liquids, are formed from two main components or sections, namely a cartridge or cartomizer section and a control unit (battery section). The cartomizer generally includes a reservoir of liquid and an atomizer for vaporizing the liquid. These parts may collectively be designated as an aerosol source. The atomizer generally combines the functions of porosity or wicking and heating in order to transport liquid from the reservoir to a location where it is heated and vaporized. For example, it may be implemented as an electrical heater, which may be a resistive wire formed into a coil or other shape for resistive (Joule) heating or a susceptor for induction heating, and a porous element with capillary or wicking capability in proximity to the heater which absorbs liquid from the reservoir and carries it to the heater. The control unit generally includes a battery for supplying power to operate the system. Electrical power from the battery is delivered to activate the heater, which heats up to vaporize a small amount of liquid delivered from the reservoir. The vaporized liquid is then inhaled by the user.

The components of the cartomizer can be intended for short term use only, so that the cartomizer is a disposable component of the system, also referred to as a consumable. In contrast, the control unit is typically intended for multiple uses with a series of cartomizers, which the user replaces as each expires. Consumable cartomizers are supplied to the consumer with a reservoir pre-filled with liquid, and intended to be disposed of when the reservoir is empty. For convenience and safety, the reservoir is sealed and designed not to be easily refilled, since the liquid may be difficult to handle. It is simpler for the user to replace the entire cartomizer when a new supply of liquid is needed.

In this context, it is desirable that cartomizers are straightforward to manufacture and comprise few parts. They can hence be efficiently manufactured in large quantities at low cost with minimum waste. Cartomizers of a simple design are hence of interest.

SUMMARY

According to a first aspect of some embodiments described herein, there is provided a heater for vaporizing aerosolizable substrate material in an electronic vapor provision system, the heater having an elongate format and formed from a planar element of electrically resistive material having a length, a width, and two pairs of opposite edges comprising two major edges substantially parallel to the length and two minor edges substantially parallel to the width, wherein the planar element is curved to form the elongate format of the heater such that the edges of one of the pairs of opposite edges are located adjacent one another and the curved planar element defines a volume to accommodate a porous material for wicking aerosolizable substrate material to the heater.

According to a second aspect of some embodiments described herein, there is provided an atomizer for an electronic vapor provision system, comprising a heater according to the first aspect, and a portion of porous material accommodated in the volume.

According to a third aspect of some embodiments described herein, there is provided a cartridge for an electronic vapor provision system comprising a heater according to the first aspect, or an atomizer according to the second aspect; and a reservoir containing aerosolizable substrate material for vaporization by the heater.

According to a fourth aspect of some embodiments described herein, there is provided an electronic vapor provision system comprising a heater according to the first aspect, or an atomizer according to the second aspect, or a cartridge according to the third aspect.

These and further aspects of the certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a heater for a vapor provision system or a vapor provision system comprising a heater may be provided in accordance with approaches described herein which includes any one or more of the various features described below as appropriate.

BRIEF DESCRIPTION OF THE DRAWINGS

Various embodiments of the disclosure will now be described in detail by way of example only with reference to the following drawings in which:

FIGS. 4, 4(A), 4(B) and 4(C) show simplified schematic cross-sectional views of a further example cartomizer in which aspects of the disclosure can be implemented;

DETAILED DESCRIPTION

Figure 1:
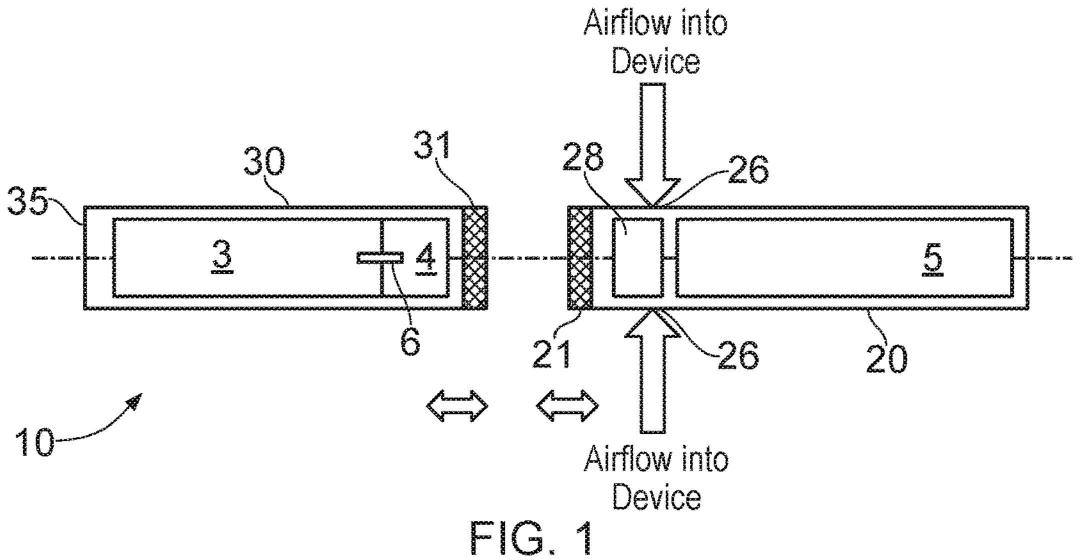
FIG. 1 shows a cross-section through an example e-cigarette comprising a cartomizer and a control unit.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) electronic aerosol or vapor provision systems, such as e-cigarettes. Throughout the following description the terms "e-cigarette" and "electronic cigarette" may sometimes be used; however, it will be appreciated these terms may be used interchangeably with aerosol (vapor) provision system or device. The systems are intended to generate an inhalable aerosol by vaporization of a substrate in the form of a liquid or gel which may or may not contain nicotine. Additionally, hybrid systems may comprise a liquid or gel substrate plus a solid substrate which is also heated. The solid substrate may be for example tobacco or other non-tobacco products, which may or may not contain nicotine. The term "aerosolizable substrate material" as used herein is intended to refer to substrate materials which can form an aerosol, either through the application of heat or some other means. The term "aerosol" may be used interchangeably with "vapor".

As used herein, the term "component" is used to refer to a part, section, unit, module, assembly or similar of an electronic cigarette or similar device that incorporates several smaller parts or elements, possibly within an exterior housing or wall. An electronic cigarette may be formed or built from one or more such components, and the components may be removably or separably connectable to one another, or may be permanently joined together during manufacture to define the whole electronic cigarette. The present disclosure is applicable to (but not limited to) systems comprising two components separably connectable to one another and configured, for example, as an aerosolizable substrate material carrying component holding liquid or another aerosolizable substrate material (a cartridge, cartomizer or consumable), and a control unit having a battery for providing electrical power to operate an element for generating vapor from the substrate material. For the sake of providing a concrete example, in the present disclosure, a cartomizer is described as an example of the aerosolizable substrate material carrying portion or component, but the disclosure is not limited in this regard and is applicable to any configuration of aerosolizable substrate material carrying portion or component. Also, such a component may include more or fewer parts than those included in the examples.

The present disclosure is particularly concerned with vapor provision systems and components thereof that utilize aerosolizable substrate material in the form of a liquid or a gel which is held in a reservoir, tank, container or other receptacle comprised in the system. An arrangement for delivering the substrate material from the reservoir for the purpose of providing it for vapor/aerosol generation is included. The terms "liquid", "gel", "fluid", "source liquid", "source gel", "source fluid" and the like may be used interchangeably with "aerosolizable substrate material" and "substrate material" to refer to aerosolizable substrate material that has a form capable of being stored and delivered in accordance with examples of the present disclosure.

FIG. 1 is a highly schematic diagram (not to scale) of a generic example aerosol/vapor provision system such as an e-cigarette 10, presented for the purpose of showing the relationship between the various parts of a typical system and explaining the general principles of operation. The e-cigarette 10 has a generally elongate shape in this example, extending along a longitudinal axis indicated by a dashed line, and comprises two main components, namely a control or power component, section or unit 20, and a cartridge assembly or section 30 (sometimes referred to as a cartomizer or clearomizer) carrying aerosolizable substrate material and operating as a vapor-generating component.

The cartomizer 30 includes a reservoir 3 containing a source liquid or other aerosolizable substrate material comprising a formulation such as liquid or gel from which an aerosol is to be generated, for example containing nicotine. As an example, the source liquid may comprise around 1 to 3% nicotine and 50% glycerol, with the remainder comprising roughly equal measures of water and propylene glycol, and possibly also comprising other components, such as flavourings. Nicotine-free source liquid may also be used, such as to deliver flavouring. A solid substrate (not illustrated), such as a portion of tobacco or other flavour element through which vapor generated from the liquid is passed, may also be included. The reservoir 3 has the form of a storage tank, being a container or receptacle in which source liquid can be stored such that the liquid is free to move and flow within the confines of the tank. For a consumable cartomizer, the reservoir 3 may be sealed after filling during manufacture so as to be disposable after the source liquid is consumed, otherwise, it may have an inlet port or other opening through which new source liquid can be added by the user. The cartomizer 30 also comprises an electrically powered heating element or heater 4 located externally of the reservoir tank 3 for generating the aerosol by vaporization of the source liquid by heating. A liquid transfer or delivery arrangement (liquid transport element) such as a wick or other porous element 6 may be provided to deliver source liquid from the reservoir 3 to the heater 4. A wick 6 may have one or more parts located inside the reservoir 3, or otherwise be in fluid communication with the liquid in the reservoir 3, so as to be able to absorb source liquid and transfer it by wicking or capillary action to other parts of the wick 6 that are adjacent or in contact with the heater 4. This liquid is thereby heated and vaporized, to be replaced by new source liquid from the reservoir for transfer to the heater 4 by the wick 6. The wick may be thought of as a bridge, path or conduit between the reservoir 3 and the heater 4 that delivers or transfers liquid from the reservoir to the heater. Terms including conduit, liquid conduit, liquid transfer path, liquid delivery path, liquid transfer mechanism or element, and liquid delivery mechanism or element may all be used interchangeably herein to refer to a wick or corresponding component or structure.

A heater and wick (or similar) combination is sometimes referred to as an atomizer or atomizer assembly, and the reservoir with its source liquid plus the atomizer may be collectively referred to as an aerosol source. Other terminology may include a liquid delivery assembly or a liquid transfer assembly, where in the present context these terms may be used interchangeably to refer to a vapor-generating element (vapor generator) plus a wicking or similar component or structure (liquid transport element) that delivers or transfers liquid obtained from a reservoir to the vapor generator for vapor/aerosol generation. Various designs are possible, in which the parts may be differently arranged compared with the highly schematic representation of FIG. 1. For example, the wick 6 may be an entirely separate element from the heater 4, or the heater 4 may be configured to be porous and able to perform at least part of the wicking function directly (a metallic mesh, for example). In an electrical or electronic device, the vapor generating element may be an electrical heating element that operates by ohmic/resistive (Joule) heating or by inductive heating. In general, therefore, an atomizer can be considered as one or more elements that implement the functionality of a vapor-generating or vaporizing element able to generate vapor from source liquid delivered to it, and a liquid transport or delivery element able to deliver or transport liquid from a reservoir or similar liquid store to the vapor generator by a wicking action/capillary force. An atomizer is typically housed in a cartomizer component of a vapor generating system. In some designs, liquid may be dispensed from a reservoir directly onto a vapor generator with no need for a distinct wicking or capillary element. Embodiments of the disclosure are applicable to all and any such configurations which are consistent with the examples and description herein.

Returning to FIG. 1, the cartomizer 30 also includes a mouthpiece or mouthpiece portion 35 having an opening or air outlet through which a user may inhale the aerosol generated by the atomizer 4.

The power component or control unit 20 includes a cell or battery 5 (referred to herein after as a battery, and which may be re-chargeable) to provide power for electrical components of the e-cigarette 10, in particular to operate the heater 4. Additionally, there is a controller 28 such as a printed circuit board or other electronics or circuitry for generally controlling the e-cigarette. The control electronics/circuitry 28 operates the heater 4 using power from the battery 5 when vapor is required, for example in response to a signal from an air pressure sensor or air flow sensor (not shown) that detects an inhalation on the system 10 during which air enters through one or more air inlets 26 in the wall of the control unit 20. When the heating element 4 is operated, the heating element 4 vaporizes source liquid delivered from the reservoir 3 by the liquid delivery element 6 to generate the aerosol, and this is then inhaled by a user through the opening in the mouthpiece 35. The aerosol is carried from the aerosol source to the mouthpiece 35 along one or more air channels (not shown) that connect the air inlet 26 to the aerosol source to the air outlet when a user inhales on the mouthpiece 35.

The control unit (power section) 20 and the cartomizer (cartridge assembly) 30 are separate connectable parts detachable from one another by separation in a direction parallel to the longitudinal axis, as indicated by the double-ended arrows in FIG. 1. The components 20, 30 are joined together when the device 10 is in use by cooperating engagement elements 21, 31 (for example, a screw or bayonet fitting) which provide mechanical and in some cases electrical connectivity between the power section 20 and the cartridge assembly 30. Electrical connectivity is required if the heater 4 operates by ohmic heating, so that current can be passed through the heater 4 when it is connected to the battery 5. In systems that use inductive heating, electrical connectivity can be omitted if no parts requiring electrical power are located in the cartomizer 30. An inductive work coil can be housed in the power section 20 and supplied with power from the battery 5, and the cartomizer 30 and the power section 20 shaped so that when they are connected, there is an appropriate exposure of the heater 4 to flux generated by the coil for the purpose of generating current flow in the material of the heater. Inductive heating arrangements are discussed further below. The FIG. 1 design is merely an example arrangement, and the various parts and features may be differently distributed between the power section 20 and the cartridge assembly section 30, and other components and elements may be included. The two sections may connect together end-to-end in a longitudinal configuration as in FIG. 1, or in a different configuration such as a parallel, side-by-side arrangement. The system may or may not be generally cylindrical or have a generally longitudinal shape. Either or both sections or components may be intended to be disposed of and replaced when exhausted (the reservoir is empty or the battery is flat, for example), or be intended for multiple uses enabled by actions such as refilling the reservoir and recharging the battery. In other examples, the system 10 may be unitary, in that the parts of the control unit 20 and the cartomizer 30 are comprised in a single housing and cannot be separated. Embodiments and examples of the present disclosure are applicable to any of these configurations and other configurations of which the skilled person will be aware.

Figure 2:
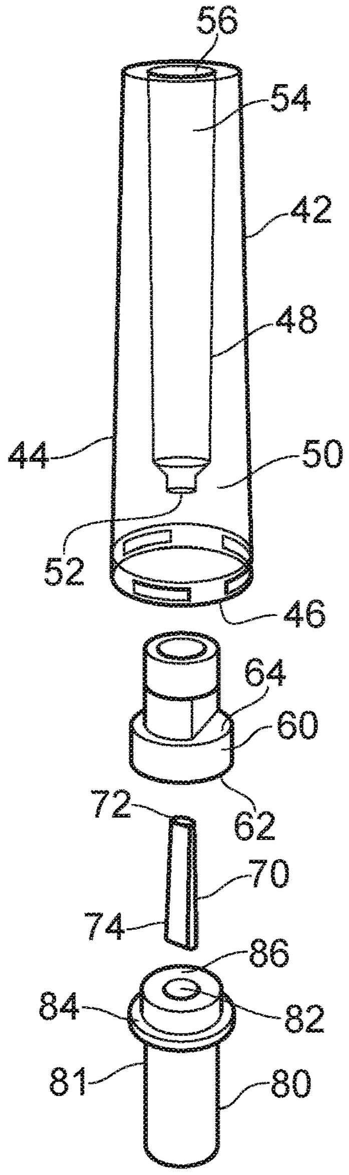
FIG. 2 shows an external perspective exploded view of an example cartomizer in which aspects of the disclosure can be implemented.

FIG. 2 shows an external perspective view of parts which can be assembled to form a cartomizer according to an example of the present disclosure. The cartomizer 40 comprises four parts only, which can be assembled by being pushed or pressed together if appropriately shaped. Hence, fabrication can be made very simple and straightforward.

A first part is a housing 42 that defines a reservoir for holding aerosolizable substrate material (hereinafter referred to as a substrate or a liquid, for brevity). The housing 42 has a generally tubular shape, which in this example has a circular cross-section, and comprises a wall or walls shaped to define various parts of the reservoir and other items. A cylindrical outer side wall 44 is open at its lower end at an opening 46 through which the reservoir may be filled with liquid, and to which parts can be joined as described below, to close/seal the reservoir and also enable an outward delivery of the liquid for vaporization. This defines an exterior or external volume or dimensions of the reservoir. References herein to elements or parts lying or being located externally to the reservoir are intended to indicate that the part is outside or partially outside the region bounded or defined by this outer wall 44 and its upper and lower extent and edges or surfaces.

A cylindrical inner wall 48 is concentrically arranged within the outer side wall 44. This arrangement defines an annular volume 50 between the outer wall 44 and the inner wall 48 which is a receptacle, cavity, void or similar to hold liquid, in other words, the reservoir. The outer wall 44 and the inner wall 48 are connected together (for example by a top wall or by the walls tapering towards one another) in order to close the upper edge of the reservoir volume 50. The inner wall 48 is open at its lower end at an opening 52, and also at its upper end. The tubular inner space bounded by the inner wall is an air flow passage or channel 54 that, in the assembled system, carries generated aerosol from an atomizer to a mouthpiece outlet of the system for inhalation by a user. The opening 56 at the upper end of the inner wall 48 can be the mouthpiece outlet, configured to be comfortably received in the user's mouth, or a separate mouthpiece part can be coupled on or around the housing 42 having a channel connecting the opening 56 to a mouthpiece outlet.

The housing 42 may be formed from molded plastic material, for example by injection molding. In the example of FIG. 2, it is formed from transparent material; this allows the user to observe a level or amount of liquid in the reservoir 44. The housing might alternatively be opaque, or opaque with a transparent window through which the liquid level can be seen. The plastic material may be rigid in some examples.

A second part of the cartomizer 40 is a flow directing member 60, which in this example also has a circular cross-section, and is shaped and configured for engagement with the lower end of the housing 42. The flow directing member 60 is effectively a bung, and is configured to provide a plurality of functions. When inserted into the lower end of the housing 42, it couples with the opening 46 to close and seal the reservoir volume 50 and couples with the opening 52 to seal off the air flow passage 54 from the reservoir volume 50. Additionally, the flow directing member 60 has at least one channel passing through it for liquid flow, which carries liquid from the reservoir volume 50 to a space external to the reservoir which acts as an aerosol chamber where vapor/aerosol is generated by heating the liquid. Also, the flow directing member 60 has at least one other channel passing through it for aerosol flow, which carries the generated aerosol from the aerosol chamber space to the air flow passage 54 in the housing 42, so that it is delivered to the mouthpiece opening for inhalation.

Also, the flow directing member 60 may be made from a flexible resilient material such as silicone so that it can be easily engaged with the housing 46 via a friction fit. Additionally, the flow directing member has a socket or similarly-shaped formation (not shown) on its lower surface 62, opposite to the upper surface or surfaces 64 which engage with the housing 42. The socket receives and supports an atomizer 70, being a third part of the cartomizer 40.

The atomizer 70 has an elongate shape with a first end 72 and a second end 74 oppositely disposed with respect to its elongate length. In the assembled cartomizer, the atomizer is mounted at its first end 72 which pushes into the socket of the flow directing member 60 in a direction towards the reservoir housing 42. The first end 72 is therefore supported by the flow directing member 60, and the atomizer 70 extends lengthwise outwardly from the reservoir substantially along the longitudinal axis defined by the concentrically shaped parts of the housing 42. The second end 74 of the atomizer 70 is not mounted, and is left free. Accordingly, the atomizer 70 is supported in a cantilevered manner extending outwardly from the exterior bounds of the reservoir. The atomizer 70 performs a wicking function and a heating function in order to generate aerosol, and may comprise any of several configurations of an electrically resistive heater portion configured to act as an inductive susceptor, and a porous portion configured to wick liquid from the reservoir to the vicinity of the heater.

A fourth part of the cartomizer 40 is an enclosure or shroud 80. Again, this has a circular cross-section in this example. It comprises a cylindrical side wall 81 closed by an optional base wall to define a central hollow space or void 82. The upper rim 84 of the side wall 81, around an opening 86, is shaped to enable engagement of the enclosure 80 with reciprocally shaped parts on the flow directing member 60 so that the enclosure 80 can be coupled to the flow directing member 60 once the atomizer 70 is fitted into the socket on the flow directing member 60. The flow directing member 60 hence acts as a cover to close the central space 82, and this space 82 creates an aerosol chamber in which the atomizer 70 is disposed. The opening 86 allows communication with the liquid flow channel and the aerosol flow channel in the flow directing member 60 so that liquid can be delivered to the atomizer and generated aerosol can be removed from the aerosol chamber. In order to enable a flow of air through the aerosol chamber to pass over the atomizer 70 and collect the vapor such that it becomes entrained in the air flow to form an aerosol, the wall or walls 81 of the enclosure 80 have one or more openings or perforations to allow air to be drawn into the aerosol chamber when a user inhales via the mouthpiece opening of the cartomizer.

The enclosure 80 may be formed from a plastics material, such as by injection molding. It may be formed from a rigid material, and can then be readily engaged with the flow directing member by pushing or pressing the two parts together.

As noted above, the flow directing member can be made from a flexible resilient material, and may hold the parts coupled to it, namely the housing 42, the atomizer 70 and the enclosure 80, by friction fit. Since these parts may be more rigid, the flexibility of the flow directing member, which enables it to deform somewhat when pressed against these other parts, accommodates any minor errors in the manufactured size of the parts. In this way, the flow directing part can absorb manufacturing tolerances of all the parts while still enabling quality assembly of the parts altogether to form the cartomizer 40. Manufacturing requirements for making the housing 42, the atomizer 70 and the enclosure 80 can therefore be relaxed somewhat, reducing manufacturing costs.

Figure 3:
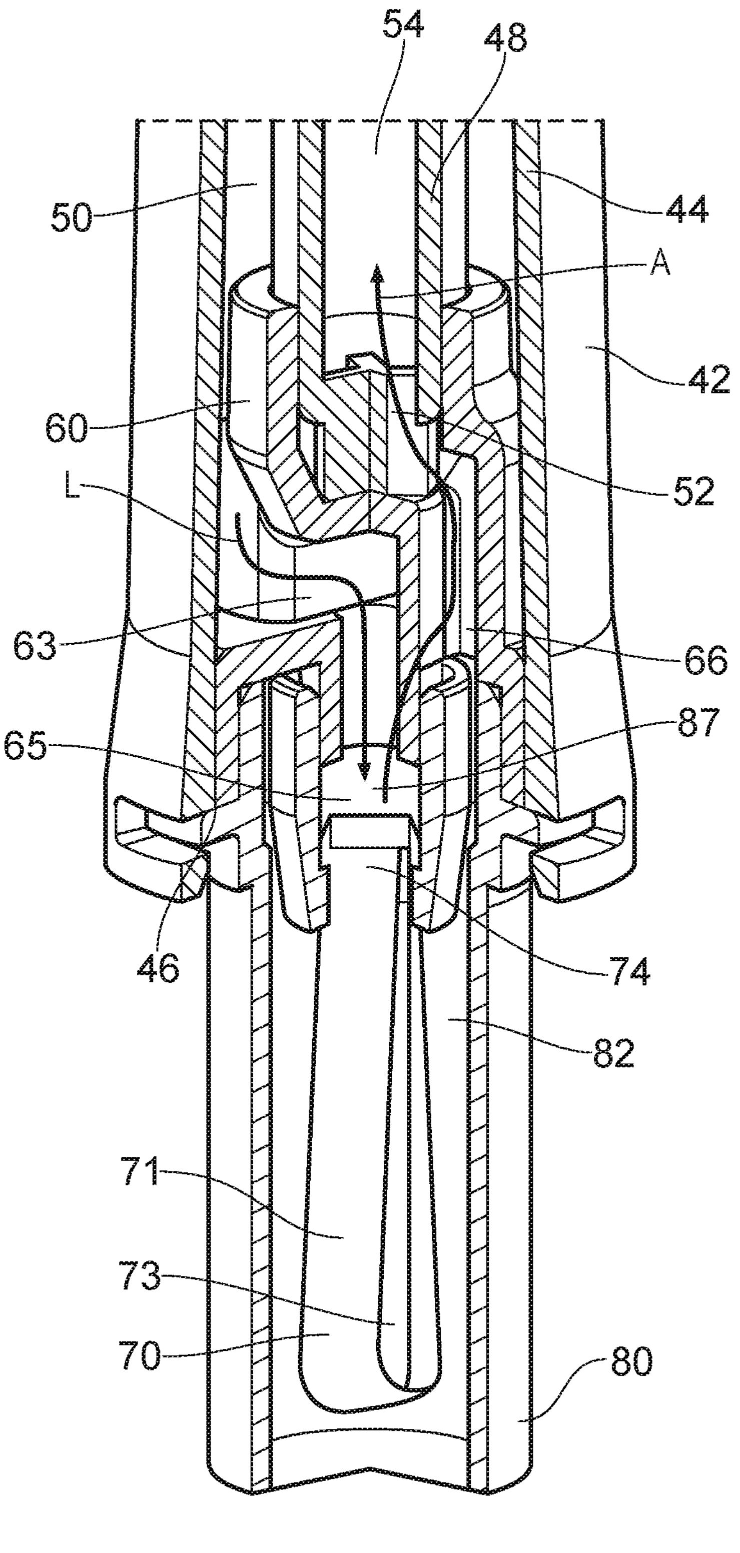
FIG. 3 shows a partially cut-away perspective view of the cartomizer of FIG. 2 in an assembled arrangement.

FIG. 3 shows a cut-away perspective view of the cartomizer of FIG. 1 in an assembled configuration. For clarity, the flow directing member 60 is shaded. It can be seen how the flow directing member 60 is shaped on its upper surfaces to engage around the opening 52 defined by the lower edge of the inner wall 48 of the reservoir housing 42, and concentrically outwardly to engage in the opening 46 defined by the lower edge of the outer wall 44 of the housing 42, in order to seal both reservoir space 50 and the air flow passage 54.

The flow directing member 60 has a liquid flow channel 63 which allows the flow of liquid L from the reservoir volume 50 through the flow directing member into a space or volume 65 under the flow directing member 60. Also, there is an aerosol flow channel 66 which allows the flow of aerosol and air A from the space 65 through the flow directing member 60 to the air flow passage 54.

The enclosure 80 is shaped at its upper rim to engage with corresponding shaped parts in the lower surface of the flow directing member 60, to create the aerosol chamber 82 substantially outside the exterior dimensions of the volume of the reservoir 50 according to the reservoir housing 42. In this example, the enclosure 80 has an aperture 87 in its upper end proximate the flow directing member 60. This coincides with the space 65 with which the liquid flow channel 63 and the aerosol flow channel 66 communicate, and hence allows liquid to enter the aerosol chamber 82 and aerosol to leave the aerosol chamber 82 via the channels in the flow directing member 60.

In this example, the aperture 87 also acts as a socket for mounting the first, supported, end 74 of the atomizer 70 (recall that in the FIG. 2 description, the atomizer socket was mentioned as being formed in the flow directing member, either option can be used). Thus, liquid arriving through the liquid flow channel 63 is fed directly to the first end of the atomizer 70 for absorption and wicking, and air/aerosol can be drawn through and past the atomizer to enter the aerosol flow channel 66.

In this example, the atomizer 70 comprises a planar elongate portion of metal 71 which is folded or curved at its midpoint to bring the two ends of the metal portion adjacent to one another at the first end of the atomizer 74. This acts as the heater component of the atomizer 70. A portion of cotton or other porous material 73 is sandwiched between the two folded sides of the metal portion. This acts as the wicking component of the atomizer 70. Liquid arriving in the space 65 is collected by the absorbency of the porous wick material 73 and carried downwards to the heater. Many other arrangements of an elongate atomizer suitable for cantilevered mounting are also possible and may be used instead.

The heater component is intended for heating via induction, which will be described further below.

The example of FIGS. 2 and 3 has parts with substantially circular symmetry in a plane orthogonal to the longitudinal dimension of the assembled cartomizer. Hence, the parts are free from any required orientation in the planes in which they are joined together, which can give ease of manufacture. The parts can be assembled together in any orientation about the axis of the longitudinal dimension, so there is no requirement to place the parts in a particular orientation before assembly. This is not essential, however, and the parts may be alternatively shaped.

Figure 4:
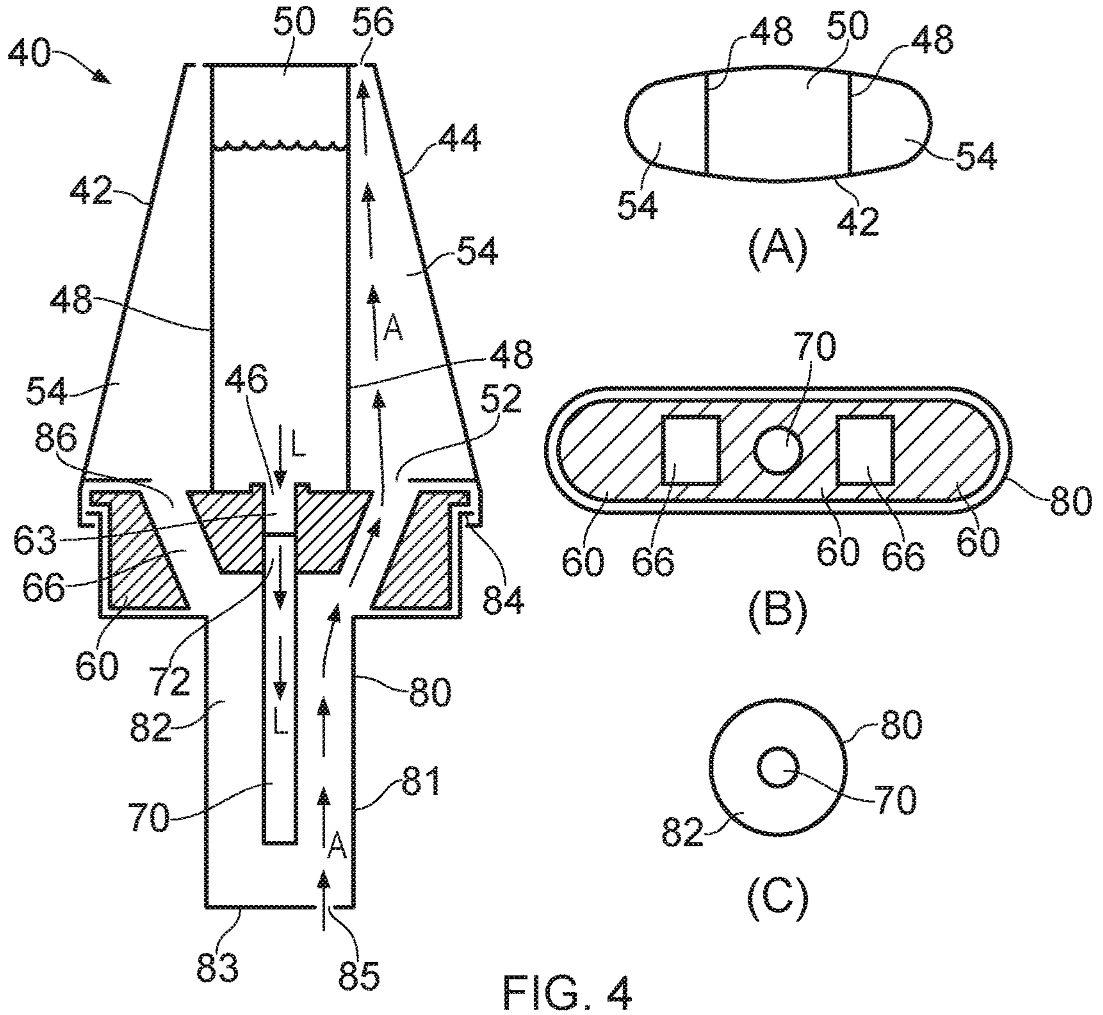

FIG. 4 shows a cross-sectional view through a further example assembled cartomizer comprising a reservoir housing, a flow directing member, an atomizer and an enclosure, as before. In this example, though, in the plane orthogonal to the longitudinal axis of the cartomizer 40, at least some of the parts have an oval shape instead of a circular shape, and are arranged to have symmetry along the major axis and the minor axis of the oval. Features are reflected on either side of the major axis and on either side of the minor axis. This means that for assembly the parts can have either of two orientations, rotated from each other by 180° about the longitudinal axis. Again, assembly is simplified compared to a system comprising parts with no symmetry.

In this example, the enclosure 80 again comprises a side wall 81, which is formed so as to have a varying cross-section at different points along the longitudinal axis of the enclosure, and a base wall 83, which bound a space that creates the aerosol chamber 82. Towards its upper end, the enclosure broadens out to a large cross-section to give room to accommodate the flow directing member 60. The large cross-section portion of the enclosure 80 has a generally oval cross-section (see FIG. 4(B)), while the narrower cross-section portion of the enclosure has a generally circular cross-section (see FIG. 4(C)). The enclosure's upper rim 84, around the top opening 86, is shaped to engage with corresponding shaping on the reservoir housing 42. This shaping and engagement is shown in simplified form in FIG. 4; in reality it is likely to be more complex in order to provide a reasonably air-tight and liquid-tight join. The enclosure 80 has at least one opening 85, in this case in the base wall 83, to allow air to enter the aerosol chamber during user inhalation.

The reservoir housing 42 is differently shaped compared with the FIGS. 2 and 3 example. The outer wall 44 defines an interior space which is divided into three regions by two inner walls 48. The regions are arranged side by side. The central region, between the two inner walls 48 is the reservoir volume 50 for holding liquid. This region is closed at the top by a top wall of the housing. An opening 46 in the base of the reservoir volume allows liquid to be delivered from the reservoir 50 to the aerosol chamber 82. The two side regions, between the outer wall 44 and the inner walls 48, are the air flow passages 54. Each has an opening 52 at its lower end for aerosol to enter, and a mouthpiece opening 56 at its upper end (as before, a separate mouthpiece portion might be added externally to the reservoir housing 42).

A flow directing member 60 (shaded for clarity) is engaged into the lower edge of the housing 42, via shaped portions to engage with the openings 46 and 52 in the housing 42 to close/seal the reservoir volume 50 and the air flow passages 54. The flow directing member 60 has a single centrally disposed liquid flow channel 63 aligned with the reservoir volume opening 46 to transport liquid L from the reservoir to the aerosol chamber 82. Further, there are two aerosol flow channels 66, each running from an inlet at the aerosol chamber 82 to an outlet to the air flow passages 54, by which air entering the aerosol chamber through the hole 83 and collecting vapor in the aerosol chamber 82 flows into the air flow passages 54 to the mouthpiece outlets 56.

The atomizer 70 is mounted by insertion of its first end 72 into the liquid flow channel 63 of the flow directing component 60. Hence, in this example, the liquid flow channel 63 acts as a socket for the cantilevered mounting of the atomizer 70. The first end 72 of the atomizer 70 is thus directly fed with liquid entering the liquid flow channel 60 from the reservoir 50, and the liquid is taken up via the porous properties of the atomizer 70 and drawn along the atomizer length to be heated by the heater portion of the atomizer 70 (not shown) which is located in the aerosol chamber 70.

FIGS. 4(A), (B) and (C) show cross-sections through the cartomizer 40 at the corresponding positions along the longitudinal axis of the cartomizer 40.

While aspects of the disclosure are relevant to atomizers in which the heating aspect is implemented via resistive heating, which requires electrical connections to be made to a heating element for the passage of current, the design of the cartomizer has particular relevance to the use of induction heating. This is a process by which an electrically conducting item, typically made from metal, is heated by electromagnetic induction via eddy currents flowing in the item which generates heat. An induction coil (work coil) operates as an electromagnet when a high-frequency alternating current from an oscillator is passed through it; this produces a magnetic field. When the conducting item is placed in the flux of the magnetic field, the field penetrates the item and induces electric eddy currents. These flow in the item, and generate heat according to current flow against the electrical resistance of the item via Joule heating, in the same manner as heat is produced in a resistive electrical heating element by the direct supply of current. An attractive feature of induction heating is that no electrical connection to the conducting item is needed; the requirement instead is that a sufficient magnetic flux density is created in the region occupied by the item. In the context of vapor provision systems, where heat generation is required in the vicinity of liquid, this is beneficial since a more effective separation of liquid and electrical current can be effected. Assuming no other electrically powered items are placed in a cartomizer, there is no need for any electrical connection between a cartomizer and its power section, and a more effective liquid barrier can be provided by the cartomizer wall, reducing the likelihood of leakage.

Induction heating is effective for the direct heating of an electrically conductive item, as described above, but can also be used to indirectly heat non-conducting items. In a vapor provision system, the need is to provide heat to liquid in the porous wicking part of the atomizer in order to cause vaporization. For indirect heating via induction, the electrically conducting item is placed adjacent to or in contact with the item in which heating is required, and between the work coil and the item to be heated. The work coil heats the conducting item directly by induction heating, and heat is transferred by thermal radiation or thermal conduction to the non-conducting item. In this arrangement, the conducting item is termed a susceptor. Hence, in an atomizer, the heating component can be provided by an electrically conductive material (typically metal) which is used as an induction susceptor to transfer heat energy to a porous part of the atomizer.

Figure 5:
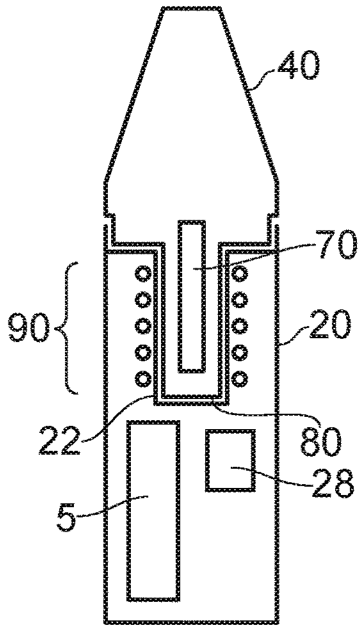
FIG. 5 shows a highly schematic cross-sectional view of a first example vapor provision system employing induction heating in which aspects of the disclosure can be implemented.

FIG. 5 shows a highly simplified schematic representation of a vapor provision system comprising a cartomizer 40 according to examples of the present disclosure and a power component 20 configured for induction heating. The cartomizer 40 may be as shown in the examples of FIGS. 2, 3 and 4 (although other arrangements are not excluded), and is shown in outline only for simplicity. The cartomizer 40 comprises an atomizer 70 in which the heating is achieved by induction heating so that the heating function is provided by a susceptor (not shown). The atomizer 70 is located in the lower part of the cartomizer 40, surrounded by the enclosure 80, which acts not only to define an aerosol chamber but also to provide a degree of protection for the atomizer 70, which could be relatively vulnerable to damage owing to its cantilevered mounting. The cantilever mounting of the atomizer 70 enables effective induction heating however, because the atomizer 70 can be inserted into the inner space of a coil 90, and in particular, the reservoir is positioned away from the inner space of the work coil 90. Hence, the power component 20 comprises a recess 22 into which the enclosure 80 of the cartomizer 40 is received when the cartomizer 40 is coupled to the power component for use (via a friction fit, a clipping action, a screw thread, or a magnetic catch, for example). An induction work coil 90 is located in the power component 20 so as to surround the recess 22, the coil 90 having a longitudinal axis over which the individual turns of the coil extend and a length which substantially matches the length of the susceptor so that the coil 90 and the susceptor overlap when the cartomizer 40 and the power component 20 are joined. In other implementations, the length of the coil may not substantially match the length of the susceptor, e.g., the length of the susceptor may be shorter than the length of the coil, or the length of the susceptor may be longer than the length of the coil. In this way, the susceptor is located within the magnetic field generated by the coil 90. If the items are located so that the separation of the susceptor from the surrounding coil is minimised, the flux experienced by the susceptor can be higher and the heating effect made more efficient. However, the separation is set at least in part by the width of the aerosol chamber formed by the enclosure 80, which needs to be sized to allow adequate air flow over the atomizer and to avoid liquid droplet entrapment. Hence, these two requirements need to be balanced against one another when determining the sizing and positioning of the various items.

The power component 20 comprises a battery 5 for the supply of electrical power to energise the coil 90 at an appropriate AC frequency. Also, there is included a controller 28 to control the power supply when vapor generation is required, and possibly to provide other control functions for the vapor provision system which are not considered further here. The power component may also include other parts, which are not shown and which are not relevant to the present discussion.

The FIG. 5 example is a linearly arranged system, in which the power component 20 and the cartomizer 40 are coupled end-to-end to achieve a pen-like shape.

Figure 6:
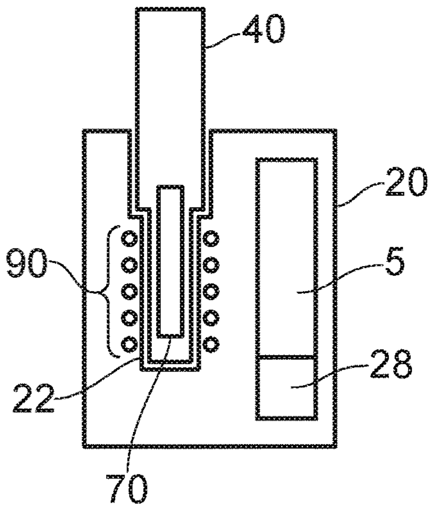
FIG. 6 shows a highly schematic cross-sectional view of a second example vapor provision system employing induction heating in which aspects of the disclosure can be implemented.

FIG. 6 shows a simplified schematic representation of an alternative design, in which the cartomizer 40 provides a mouthpiece for a more box-like arrangement, in which the battery 5 is disposed in the power component 20 to one side of the cartomizer 40. Other arrangements are also possible.

As previously briefly described, the atomizer is elongate and comprises a heater portion and a porous portion. Liquid from the reservoir is delivered to the porous portion which absorbs the liquid and carries it by capillary action, also described as wicking, to the vicinity of the heater, from which heat energy is delivered to liquid in order to vaporize it.

According to examples, the heater has an elongate format or shape, and generally defines the exterior of the atomizer. By “elongate” it is meant that the heater has a shape with a length and a width (for example, a greatest width in the event that the width varies along the length) in which the length significantly exceeds the width. For example, the length may be at least two times the width, or at least three times the width, or at least four times the width, or at least five times the width, or at least ten times the width. Other values are not excluded, however.

The heater may usefully be formed from a planar piece of element of a suitable material, which is electrically resistive/conductive, in other words able to carry an electrical current. This enables the heater to have its temperature increased by exposure to a magnetic field generated by a high frequency alternating current in a work coil, by induction effects as noted above, where the magnetic flux induces eddy currents in the heater material. As an alternative, the heater may be supplied directly with an electrical current so as to undergo a temperature increase when the current experiences the resistivity of the heater material via the Joule effect (ohmic heating or resistive heating). The planar element can be considered as a sheet of the appropriate material, suitably dimensioned and shaped for making into a heater. The planar element is formed into the heater by being curved or bent into a non-flat shape (the element no longer occupies a single plane). The curving may be considered to be rolling or folding, according to various examples. In all cases, at least part of the planar element is curved according to an appropriate radius of curvature in order to create the elongate format of the heater.

Figure 7:
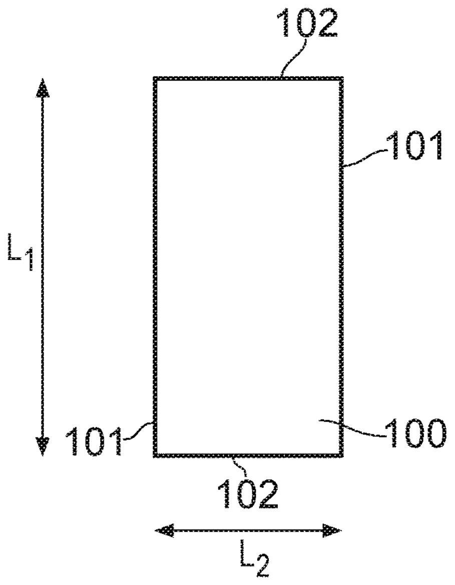
FIG. 7 shows a plan view of a planar element for forming a heater for an atomizer according to a first example.

FIG. 7 shows a plan view of a planar element of electrically resistive material for forming a heater according to examples. The planar element 100 has a generally rectangular shape, with a length L1 and a width L2. It has a pair of minor edges 102 which are opposite and substantially parallel to one another and to the width L2. Extending between the minor edges are a pair of major edges 101 which are opposite and substantially parallel to one another and to the length L1. Portions of the planar element proximate the edges may be termed major edge portions and minor edge portions respectively. Although in this example the planar element has a regular rectangular shape, this is not essential, and more complex shapes may be used which lack straight edges, for example. Overall, however, the edges generally along the longer dimension are the major edges and the edges generally along the shorter dimension are the minor edges. The width can be taken to be the greatest dimension in the direction generally parallel to the shorter dimension, and the length can be taken to be the greatest dimension in the direction generally parallel to the longer dimension.

The planar element 100 is curved into a desired heater, which has an elongate format or shape. Examples of possible curvatures are described below.

Figure 8:
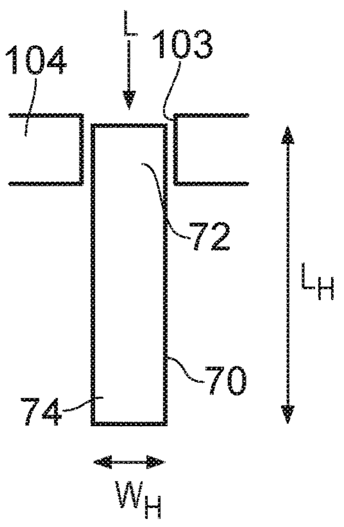
FIG. 8 shows a simplified schematic representation of an atomizer supported in a socket according to an example.

FIG. 8 shows a highly simplified schematic representation of an elongate atomizer 70 comprising an elongate heater (not shown separately). The heater, having this elongate format, extends between the first end 72 and the second end 74 of the atomizer. The heater/atomizer can be mounted for use by insertion of the first end 72 into a socket 103 formed in a support portion or supporting portion 104. The supporting portion may variously be comprised in or designated as the enclosure 80 or the flow directing member 60, as in the examples of FIGS. 2-4, for example. Other designs of supporting portion may alternatively be provided if desired. In any case, the heater/atomizer 70 can be held and supported merely by insertion into the socket 103 if the heater/atomizer 70 and socket 103 are similarly sized, for example by a friction fit. This provides a cantilevered arrangement for the atomizer. The first end 72 includes access to a portion of porous material comprised in the atomizer for wicking, as described further below, and is located so as to receive liquid L from the reservoir of the cartomizer as in FIG. 3 or FIG. 4.

The elongate format of the heater has a length $L_H$ and a width $W_H$. These dimensions may have a ratio in the range of $L_H$:$W_H$=2:1 to 6:1, for example, or 3:1 to 5:1. The length should not be too long as this may inhibit liquid from reaching the lower part of the elongate atomizer. Additionally, the width should not be too great as this increases the overall dimensions of the cartomizer and the enclosure (which requires a corresponding increase in the dimensions of the work coil). In one example, the length of the elongate format heater is 12 mm and the width is 3 mm.

In some examples, the planar element 100 is curved about an axis substantially parallel to the minor edges 102, in order to bring the minor edges adjacent to one another.

Figure 9:
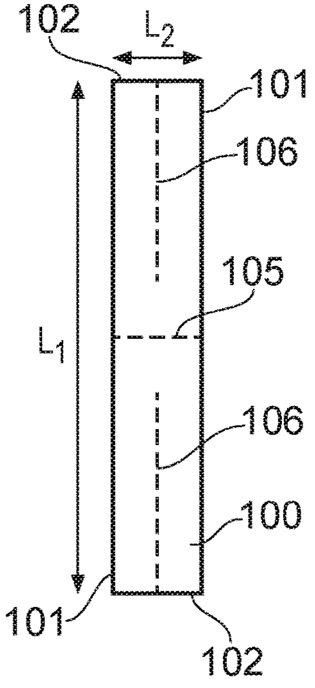
FIG. 9 shows a plan view of a planar element for forming a heater for an atomizer according to a second example.

FIG. 9 shows a plan view of an example planar element 100 (or blank for forming a heater) with a length L1 and a width L2 as before. The planar element 100 has a ratio of length to width typically in the range of 4:1 to 12:1, for example, or 6:1 to 10:1, and is well-suited for making heaters of a folded elongate format, in some examples. In one example, the length L1 is substantially 24 mm and the width is substantially 3 mm. The planar element 100 has an axis 105 shown across its central portion, parallel to the direction of the minor edges and the width L2 and substantially midway between the minor edges 102. In order to make a heater from the planar element, the planar element 100 is curved or bent about or around the axis 105 in order to bring the two minor edges 102 into close proximity to each other; the minor edges 102 are made so as to be located adjacent to one another. The planar element 100 is in effect folded along the axis 105 so that the portions of the planar element on either side of the axis 105 are brought into a facing relationship. However, the fold is not well defined or sharp, but takes the form of a curvature of the planar element. This is to leave a space between the two portions of the planar element that defines a volume or cavity for holding or accommodating the porous material required to make an atomizer from the heater.

Figure 10:
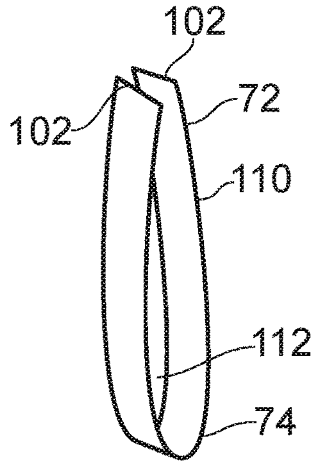
FIG. 10 shows a perspective side view of a heater formed from the example planar element of FIG. 9.

FIG. 10 shows a perspective side view of a heater 110 formed in this way from a planar element such as that of FIG. 9. The heater 110 has a folded shape created as described, with the two minor edges 102 of the planar element brought together into adjacency by the curvature at the midpoint axis of the planar element. The adjacent minor edges 102 form a first end 72 of the heater 110, and the folded or curved area forms a second end 74 of the heater 110. The two facing portions of the heater, on either side of the fold or curve, have a space between them, which is a volume 112 for accommodating a porous material (not shown).

Figure 11:
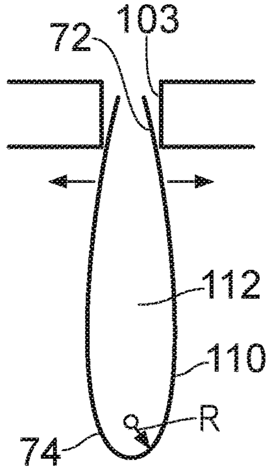
FIG. 11 shows a cross-sectional side view of the heater of FIG. 10 supported in a socket.

FIG. 11 shows a simplified schematic side view of a folded heater 110 mounted by insertion of the two minor edges into a socket 103, as in the FIG. 8 example. Since the heater 110 is formed by folding or curving or curling a planar element of, typically, metal sheet material, the folded shape may have a certain resilience against the folded position, with the minor edges having a bias to revert to their pre-folded positions (unfolding the planar element). When the heater 110 is inserted into a socket 103 for cantilevered mounting, the two minor edge portions will want to spring outwards as shown by the arrows in FIG. 11, and will hence press against the side wall of the socket 103. This will assist in keeping the heater 110 in place in the socket 103. If desired, tabs, notches or similar can be cut or stamped into the minor edge portions in order to provide toothed, barbed or other shaped surface features that can help with engagement of the heater ends 102 with the inside of the socket 103. This can assist or replace any biasing to hold the heater 110 in the socket 103.

The curved part of the heater 110 at the second end 74 has a radius of curvature R (bend radius) about an axis parallel to the midway axis 105 of the planar element 100 (see FIG. 9). The radius of curvature is typically small, for example in the range of 0.25 mm to 2.5 mm, or 0.75 mm to 1.0 mm or 0.5 mm to 1.5 mm. The curvature should preferably not be less than 0.25 mm since this can make the curved shape too brittle, and susceptible to breakage or snapping. Curvatures in excess of 2.5 mm may be unsuitable as requiring too much wicking (porous) material and generally offering an excessive volume for the porous material and making the overall heater dimensions too large. Curvatures within the given ranges bring the facing portions of the heater into closely spaced proximity so that the volume 112 for the porous material is of a modest capacity and able to hold a workable amount of porous material (not shown) in an at least moderately constrained condition, so that it does not fall out of the volume 112. In effect, the porous material can be sandwiched between the two halves of the heater 110.

It has been found that a heater shaped with a simple midpoint curved fold in this way can have a tendency for the sides to bow outwardly as the porous material in the volume 112 absorbs liquid from the reservoir and hence increases in size. If the material of the heater is quite thin and lacking any high degree of rigidity or structural integrity, the increasing size of the porous material is able to increase the capacity of the volume 112. This can have several effects. The porous material may be less securely or tightly held by the heater, and have a tendency to fall out, thereby disassembling the atomizer. In an induction heating arrangement (see FIGS. 5 and 6) the changed shape of the heater will change the position of at least parts of the heater within the magnetic field of the work coil. In turn, this can alter the level of magnetic flux to which the heater is exposed, changing the amount of heating from the intended level so that vapor generation is affected. Consequently, it may be desired to introduce features which increase the structural integrity or rigidity of the heater.

Referring back to FIG. 9, two lines 106 are indicated, which are parallel to the major edges 101, and about midway between the major edges 101. They extend from the minor edges 102 towards the fold axis 105 at the midway point, but not extending all the way to the fold axis 105. These lines or similar lines can be used to form creases in the planar element, by folding relatively sharp folds or creases along the position of the line 106 before curving the planar element about the midpoint fold axis 105. The creases are made both in the same direction, and make an angled formation in the planar element. The curvature is implemented so that the portions of the planar element on either side of the curve are brought into the required facing relationship with the concave faces of the creased formations facing towards each other.

Figure 12:
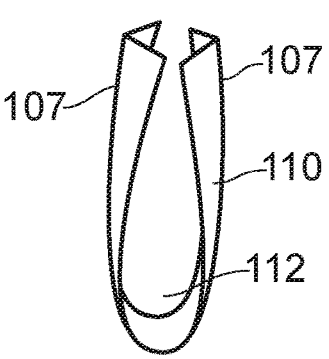
FIG. 12 shows a perspective side view of an alternative heater formed from the example planar element of FIG. 9.

FIG. 12 shows a perspective view of a heater 110 formed with creases in this way. The creases may be described as longitudinal since they are along the length dimension of the heater 110. The creases 107 make outwardly facing angles. These have the effect of increasing the strength and rigidity of the heater 110 so that it can better resist outward bowing under the force of liquid absorbed by porous material in the volume 112. Also, the angled faces provided by the creasing makes the heater 110 extend around more of the volume 112 so that porous material can be held in place more securely.

The FIG. 12 example has creases along the lines 106 depicted in FIG. 9 so that the creasing is not implemented in the region of the curved fold. This may make formation of the curvature easier to achieve since the planar element will not resist bending so much in its central region. Alternatively, though, the two crease lines 106 may be replaced by a single crease line extending the full length of the planar element 100, across the central portion where the curved fold will be made. As a further alternative, more creases can be introduced. For example, each line 106 in FIG. 9 could be replaced by two lines 106 each folded in the same direction. This will give two angles and three angled faces for each half of the heater, giving a somewhat hexagonal cross-section to the volume 112 in place of the somewhat square cross-section of the FIG. 12 example. Additional creases may be used to add more structural rigidity to heaters made from very thin and flexible material, for example, although extra creases will generally increase manufacturing complexity.

Figure 13:
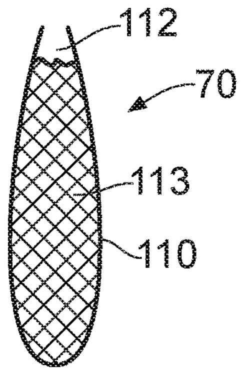
FIG. 13 shows a cross-sectional side view of an example atomizer comprising the heater of FIG. 10.

FIG. 13 shows a simple side view of a folded heater 110 configured as an atomizer 70. The atomizer 70 comprises a folded heater 110, such as the heater of FIG. 10, and a portion of porous material 113 disposed within the volume 112 defined by the curvature of the planar element from which the heater 110 is formed. The porous material may comprise any suitable wicking material. For example, it may be made from fibers which are grouped, bunched, wadded, woven or non-woven into a fabric or a fibrous mass, where interstices are present between adjacent fibers to provide a capillary effect for absorbency and wicking. Examples of fiber materials include cotton (including organic cotton), ceramic fibers and silica fibers. Other suitable materials are not excluded and will be apparent to the skilled person.

Figure 14:
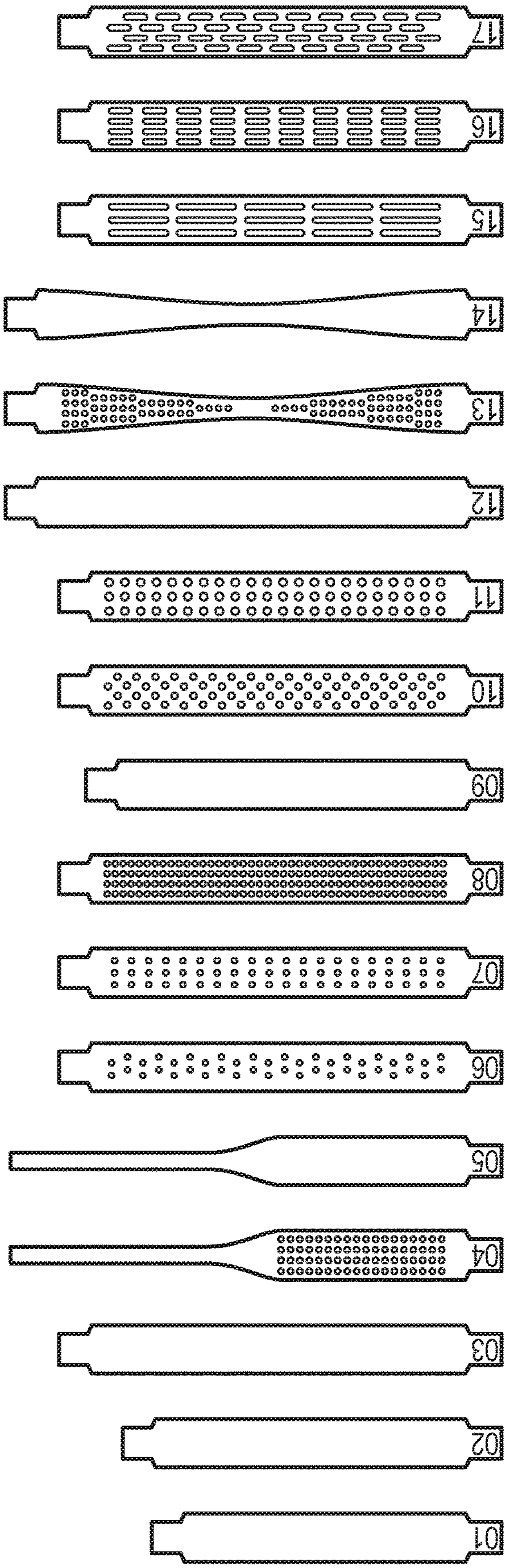
FIG. 14 shows plan views of a selection of further example planar elements for forming heaters.

The planar element is not limited to a simple rectangular shape as in the FIG. 9 example. FIG. 14 shows plan views of a plurality of alternative shapes. In this case, each planar element has shaped end portions of a lesser width. These are the minor edges brought together by the folding for insertion into a socket for mounting of the atomizer, and a decreased width can allow a smaller socket to be used without reducing the amount of heater material available for heating and vaporization of the liquid. Some examples include a narrow central portion where the width is reduced compared to the width at the ends; this can make the folded curve easier to form since a reduced amount of material needs to be bent, allowing a lower force to be used.

Note also that many of the planar elements in FIG. 14 include a plurality of perforations, being holes cut or punched through the material of the planar element. Each hole is small compared to the area of the planar element, and the holes are relatively closely packed and evenly distributed over the planar element so that many holes are included. The holes may be circular, for example, or may be elongated or slot-shaped as in the three examples on the right of FIG. 14. The purpose of the holes is to enable the generated vapor to more easily escape from the atomizer into the aerosol chamber to be collected by the airflow through the aerosol chamber. Liquid in the porous material within the atomizer is vaporized by the heat from the heater, and can flow outwardly through the perforations into the free space of the aerosol chamber.

When designing the heater, it may be necessary to balance the increased ease of vapor flow afforded by additional perforations with the decreased amount of heater material available for heating. Accordingly, one can consider an optimum total area for the perforations compared to the area of the heater material which generates heat and provides it for vaporization. If we define the total heater material area without any holes, a range for the total area then taken up the perforations may be in the range of about 5% to 30%, for example about 20% of the total heater material area, for example. In any case, it is useful that the total area of the perforations does not exceed about 50%, due to manufacturing restrictions. Also, too large an open area (total area of the perforations) may lead to poor inductive coupling in the event that induction heating is used, while too small an open area makes it difficult for generated vapor to escape from the porous material.

Perforations, holes or openings may be provided for another purpose. Referring to FIG. 11, it can be appreciated that the minor end portions of the heater are inserted into the socket for mounting of the atomizer. While it is the part of the heater located in the aerosol chamber which is intended to undergo a temperature increase for heating purposes (in an induction arrangement, this unsupported part of the heater is the part disposed in the magnetic field of the work coil), the thermal conduction properties of the heater material mean that heat will be conducted to the supported end inside the socket. This may be acceptable if the socket is made from a heat-resistant material but otherwise, or for other reasons, it may be preferred to minimise the temperature increase at the supported end of the heater. This can be achieved by providing a line or lines of perforations across the planar element parallel to the minor edges.

Figure 15:
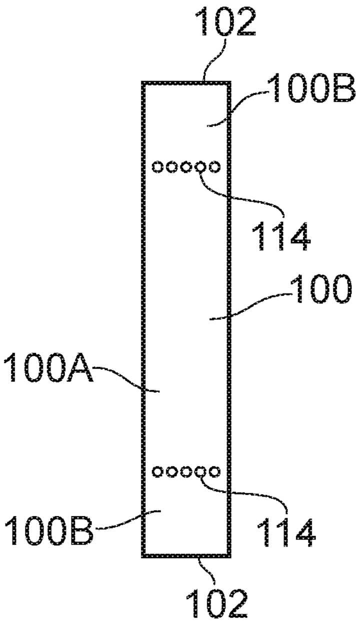
FIG. 15 shows a plan view of a planar element for forming a heater according to an example with perforations to limit heat conduction.

FIG. 15 shows a plan view of an example planar element configured in this way. A line of perforations 114, holes, apertures or openings is cut through the material of the planar element 100 towards each of the minor edges 102. The perforations are intended to be sufficiently large (by total area of all the perforations in the line) to remove adequate material from the planar element to reduce the transfer of heat by thermal conduction from one side of the line to the other. The planar element is hence divided by the lines of perforations 114 into a central portion 100A in which the curved fold is formed and which forms the part in which heat is generated, and two end portions 100B adjacent the minor edges 102. The perforations reduce heat movement from the central portion 100A to the end portions 110B and hence reduce the amount of heat to which the rest of the cartomizer is exposed via the connection of the heater to the cartomizer at the socket.

Figure 16:
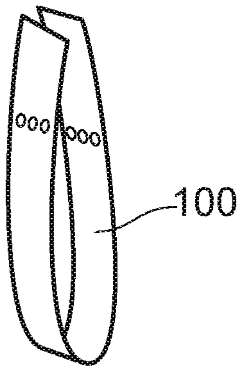
FIG. 16 shows a perspective side view of a heater formed from the planar element of FIG. 15.

FIG. 16 shows a perspective view of the planar element of FIG. 15 formed into a folded heater 100.

Perforations for the escape of vapor and perforations to inhibit conduction of heat can be combined together in a single heater. The two types of perforation may be differently sized or shaped for example.

A heater may alternatively be made from a planar element by curving the planar element about a different axis, orthogonal to the axis used in the folded embodiment.

Figure 17:
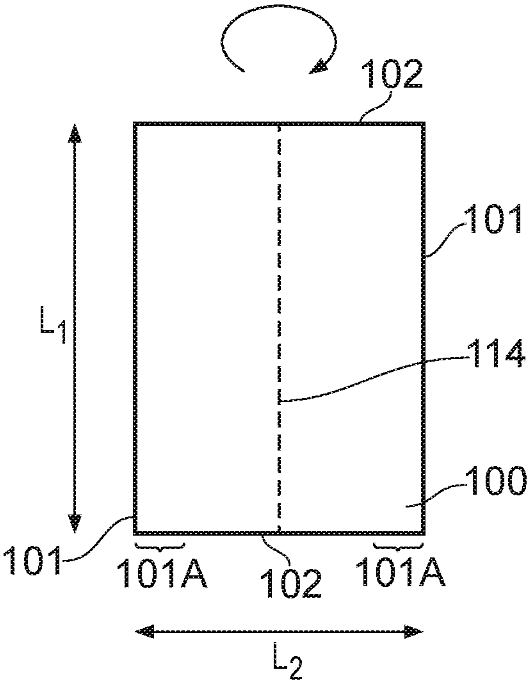
FIG. 17 shows a plan view of a planar element for forming a heater for an atomizer according to a further example.

FIG. 17 shows a plan view of an example planar element for making an alternative elongate heater. As before, the planar element 100 has a rectangular shape bounded by two opposite major edges 101 and two opposite minor edges 102. The length parallel to the major edges, and hence the longer dimension, is L1, and the width parallel to the minor edges, and hence the shorter dimension is L2. In order to form an appropriately proportioned heater, the ratio of these dimensions, L1:L2 may in the range of 2:r to 6:π, for example, or 3:π to 5π, although other proportions are not excluded. The regions or portions of the planar element 100 adjacent to the major edges 101 can be considered as major edge portions 101A.

In order to form a heater from the planar element 100, the planar element is forced into a curved shape where the curvature is about an axis parallel to the length of the planar element, in other words parallel to the line of perforations shown as 114 in FIG. 17. The curving action can be considered as rolling of the planar element 100, indicated by the curved arrow in FIG. 17, so that the planar element is rolled into a tube shape. Hence the heater has a tubular format, with a length $L_H$ greater than its width $W_H$ (diameter in the case of a cylindrical tube), in order to provide the required elongate format for the heater. The tube may be formed to have a circular cross-section in a plane orthogonal to the length, for example, but this is not required and other shapes may be used. For example, the cross-section may be an oval shape.

Hence, in this example, the curving of the planar element is over the full extent of the planar element in the width direction. This is in contrast with the folded heater examples of FIGS. 9-13, where the curving is over the central part of the planar element in the length direction only.

Figure 18A:
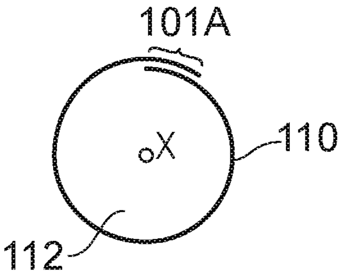
FIG. 18A shows an end view of an example heater which can be formed from the planar element of FIG. 17.

FIG. 18A shows an end view of an example heater 110 with a tubular format that may be formed from a planar element such as that of FIG. 17. The planar element has been given a curvature by rolling it about a central axis x which is parallel to the length of the planar element, to bring the major edges 101 of the planar element adjacent to one another and to create a cylindrical tube with a circular cross section. This gives a heater 110 with a tubular format. In this example, the planar element has been rolled such that the two major edge portions 101A of the planar element next to the major edges 101 are overlapped with one another. The tubular shape enables the curved planar element to define a central cylindrical volume 112, being the hollow space inside the tube. This volume is to accommodate a portion of porous material to allow the heater 110 to be used in an atomizer.

Figure 18B:
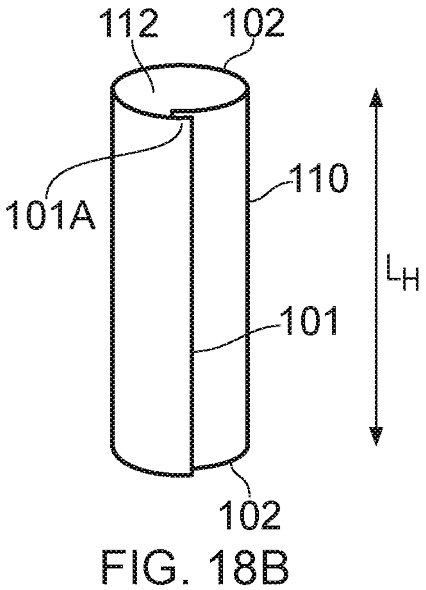
FIG. 18B shows a perspective side view of the heater of FIG. 18A.

FIG. 18B shows a perspective side view of the heater 110 of FIG. 18A.

In this configuration where the major edge portions 101A are overlapped, the tube is formed as a closed tubular format, in that there are no openings along the length LH of the heater 110. There are two options available to implement this. In a first alternative, the overlapping portions 101A can be left separate from one another. They are hence free to slide over each other to reduce or expand the circumference of the tube, and hence alter the capacity of the volume 112. This can be useful when installing porous material into the volume when fabricating the atomizer. The porous material will typically have to fit closely or tightly inside the tube so that it does not fall out when the atomizer is vertical, so if the tube can be expanded the porous material can be installed more easily. The tube can then retract back to its original circumference, in order to grip the porous material more tightly. Also, the adjustment offered by the overlap can allow the heater to accommodate changes in the volume of the porous material if it absorbs more or less liquid.

In a second alternative, the overlapping portions 101A can be fixed or joined to one another in order to create a tube of a fixed circumference and fixed capacity volume. The overlap may be secured by welding or crimping, for example, or any method able to withstand the temperature increases when the heater is operational. A fixed size of heater may be preferred in designs where the width of the aerosol chamber around the heater is small so that increases in atomizer volume could restrict air flow past the atomizer, or encourage droplet formation in the reduced space.

In a still further alternative, the planar element can be shaped by rolling about the axis X in such a way that the major edges are brought adjacent to one another on either side of a small intervening gap. The major edges do not touch, and the major edge portions are not overlapped.

Figure 19A:
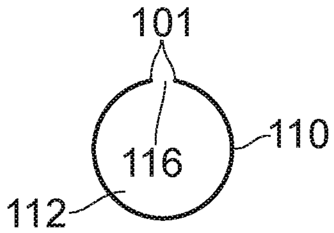
FIG. 19A shows an end view of another example heater which can be formed from the planar element of FIG. 18.

FIG. 19A shows an end view of an example heater 110 formed in this way. As with the previous example, the tubular format of the heater 110 has a circular cross-section in the plane parallel to the width, with the planar element curved around to define a central cylindrical volume 112 for accommodating porous material. The two major edges 101 face one another on either side of a gap 116 or space.

Figure 19B:
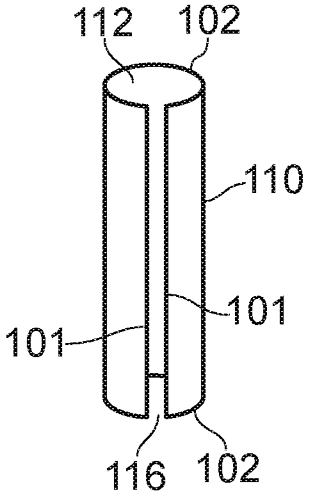
FIG. 19B shows a perspective side view of the heater of FIG. 19A.

FIG. 19B shows a perspective side view of the heater of FIG. 19A. The gap 116 between the adjacent major edges 101 extends the full length of the heater. Hence the tubular format of the heater is open along the heater's length. This configuration can be useful in allowing vapor formed by heating liquid held in porous material accommodated in the volume 112 to escape more easily, via the gap 116, into the aerosol chamber. Also, if the planar element material is sufficiently thin to allow some flexing of the tubular shape, the heater circumference can vary with changes in the size of the porous material, in the manner described for the overlapping edge portion example where the edge portions are free and not fixed to one another.

When a heater with a elongate tubular format is formed into an atomizer by the addition of porous material into the volume or gap 116 within the tube, there is a risk that the porous material may fall out of the lower end of the tube when the atomizer is vertical. The tube is open at its lower end, so the porous material may slide downwards, for example as it becomes heavier and more lubricated with absorbed liquid. A tightly fitting portion of porous material may avoid this effect.

An alternative approach is to form the tubular heater with a closed end.

Figure 20:
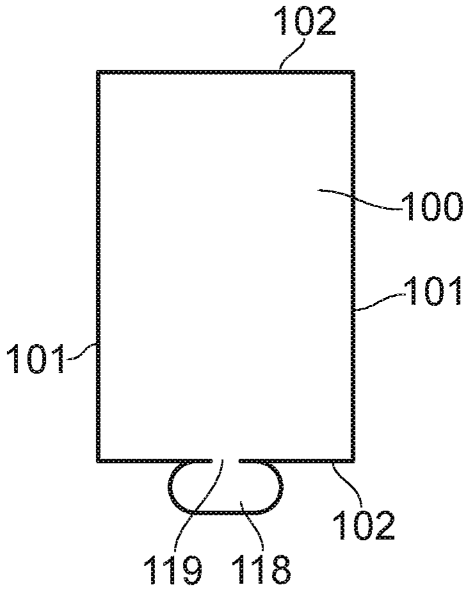
FIG. 20 shows a plan view of an additional example planar element for forming a heater.

FIG. 20 shows a plan view of a planar element configured to form a closed end tubular format elongate heater. The planar element 100 comprises a substantially rectangular portion as in previous examples, bounded by two major edges 101 and two minor edges 102. An end portion is also provided, in the form of a shaped portion 118 with a size and shape corresponding to an intended cross-section of the tube into which the planar element 100 is to be curved. The shaped portion 118 is connected to and extends outwardly from one of the minor edges 102, at a junction region 119. The heater is formed as before by curving the planar element in a rolling action around an axis parallel to the length to form a tube open at both ends. Then, the end portion 118 is bent inwardly by folding across the junction region 119. By moving the end portion 118 through roughly 90 degrees, the end portion is moved to a position where it substantially covers the open end of the tube, thereby forming a tube closed at one end. In this example, the end portion is shown to have an oval shape, suitable for closing the end of a tube of oval cross-section.

It may be preferred to implement manufacturing by inserting the required porous material into the volume 112 defined by the curved planar element through the lower end of the tube while it is still open, and then bending the end portion into position to close the tube end. Alternatively, for both open ended and closed ended tubes, the porous material might be placed on the planar element while it is still flat, and the planar element rolled around the porous material to create the tubular format.

It is not necessary for the end portion to entirely close the end of the tube. A gap or open space around some or all of the edge of the end portion can be beneficial in allowing vapor to escape from the volume in the heater to the aerosol chamber around the heater. Hence there is no need to form any seal or join around the edge of the end portion. Also, the end portion can be particularly configured to enable the passage of vapor out of the atomizer, by providing potential support under the porous material while only partially closing the end of the tube. For example, the end portion may have a size or shape which is smaller than/less than the cross-section of the tube to increase the size of a gap around the end portion when it is bent into place. The end portion might be provided with apertures for the passage of vapor. Hence, in general, the end portion at least partially closes or covers the lower end of the heater tube.

The porous material placed into the volume 112 to form an atomizer from the heater may be formed from fibers of various materials, as described above with regard to the folded heater format. In this case, a portion of the porous material can be used to fill or partially fill the volume 112 inside the heater tube. The tube can then be inserted into a socket formation on a component of a cartomizer to support the heater in the required cantilevered position.

An alternative to fibrous material which is particularly compatible with the tubular heater format is a porous element in the form of a rod or stick of porous ceramic material. Porous ceramic comprises a network of tiny pores or interstices which is able to support capillary action and hence provide a wicking capability to absorb liquid from a reservoir and deliver it to the vicinity of the heater for vaporization. In the present context, a rod of porous ceramic may be inserted into a tubular heater after the heater is formed. An expandable circumference of the heater provided by non-fixed major edges may aid in this; the circumference can be opened for easier insertion of the rod, and then the rolled format will allow the heater to contract again around the rod, thereby gripping it tightly for good contact between the heater and the ceramic. For this, the rod and the tube should ideally have the same cross-sectional shape, although the overall effect is the same for unmatched shapes. The contact will be reduced, however, so that heat transfer to the liquid may be lessened. However, some gaps between the outer surface of the ceramic rod and the inner surface of the heater may help with the escape of vapor to the aerosol chamber. If the heater has a closed lower end as described with respect to FIG. 20, a looser fit between the heater and the ceramic rod can be tolerated since there is no requirement for the heater to grip the ceramic to hold the atomizer together.

Alternatively, the atomizer may be fabricated by providing the ceramic rod, and then rolling the planar element around the rod, either tightly or loosely as preferred.

The ceramic rod may be sized so as to be wholly enclosed within the heater when the atomizer has been assembled. It may be the same length as the heater, or shorter than the heater, for example. The heater, being the external part of the atomizer, is then inserted into a socket in a cartomizer for mounting the atomizer.

Figure 21:
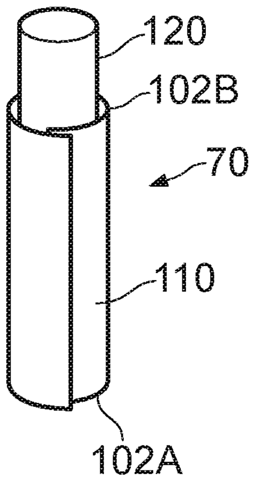
FIG. 21 shows a perspective side view of an example atomizer comprising a heater such as the FIG. 18B example.

FIG. 21 shows a perspective side view of an alternative configuration. An atomizer 70 comprises a tubular format heater 110 rolled around a porous element in the form of a ceramic rod 120. The ceramic rod 120 preferably coincides with the lower edge 102A of the heater 110 at its base, for effective heating of liquid in the lower part of the rod without any heat energy waste. At the upper end, however, the ceramic rod 120 protrudes above the top edge 102B of the heater 110. This allows the atomizer to be mounted into a socket by the ceramic rod 120 only. The heater 110 need not come into contact with the socket, so that potentially undesirable heat transfer from the heater to the material of the socket can be reduced or avoided.

In order to improve the release of vapor from the atomizer into the aerosol chamber, a tubular format heater may be provided with a plurality of perforations or apertures, as described for the folded format heater with reference to FIG. 14. The perforations may be provided with an even distribution over all of the heater surface, or over only part of the heater surface, or may be provided at a different density (perforations per unit area) at different parts of the heater. The perforations may have any shape, as before.

Figure 22:
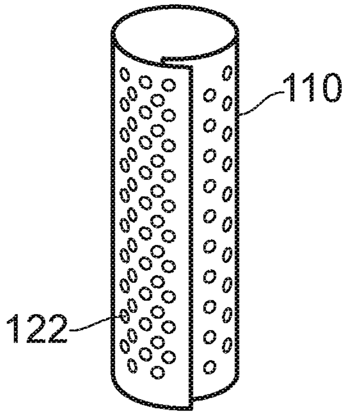
FIG. 22 shows a perspective side view of an example heater with perforations for vapor release.

FIG. 22 shows a perspective side view of a tubular format elongate heater 110 which is provided with perforations 122 that are evenly distributed over the whole of the heater surface. Vapor is thereby enabled to escape with equal ease from all parts of the atomizer. As with the folded heater format, it may be desirable to balance the increased ease of vapor flow afforded by additional perforations with the decreased amount of heater material available for heating. Accordingly, one can consider an optimum total area for the perforations compared to the area of the heater material which generates and delivers heat for vaporization. If we define the total heater material area without any holes, a range for the total area then taken up by the perforations may be in the range of about 5% to 30%, such as about 20% of the total heater material area, for example. In any case, it is useful that the total area of the perforations does not exceed about 50%, due to manufacturing restrictions. Also, too large an open area (total area of the perforations) may lead to poor inductive coupling in the event that induction heating is used, while too small an open area makes it difficult for generated vapor to escape from the porous material. Also, a greater open area than used for a folded format elongate heater may be useful to allow adequate escape for vapor, owing to the absence of the open sided configuration of the folded format. The total heater material area may be the total area of the planar element, for example.

The example atomizer of FIG. 21 is able to mounted in a socket by the ceramic porous element, as discussed above. This saves the socket from direct exposure to heat from the heater. In examples where the atomizer is mounted via insertion of the heater into the socket, it may be beneficial to reduce the amount of heat that can propagate from the heater to the socket material. The same approach can be used for a tubular format heater as for a folded format heater, described with respect to FIGS. 15 and 16. One or more lines of perforations can be made in the planar element, substantially parallel to the minor edge intended as the upper edge of the heater, and closer to that minor edge than the opposite minor edge. The portion of the planar element below the perforation line, which is a major portion, is intended to act as the susceptor in cases where induction heating is used, and will therefore be the part of the heater where heat energy is generated. The portion of the planar element above the perforation line, which is a minor portion, is the part to be inserted into the socket that supports the heater, and will therefore be the part where minimal heat is desirable. The perforations, by reducing the amount of material available for thermal conduction, will reduce the propagation of heat from the susceptor part to the socket mounting part, so exposure of the socket to heat is reduced.

Figure 23:
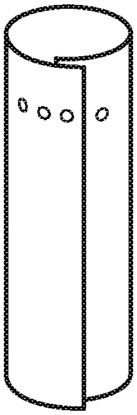
FIG. 23 shows a perspective side view of an example heater with perforations to limit heat conduction.

FIG. 23 shows a perspective side view of a tubular format elongate heater 110 which is provided with a single line of perforations 114, holes or apertures for the purpose of reducing thermal conduction to the socket mounting part of the heater 110.

The rolled structure of the tubular format heater examples can provide a heater with an adequate degree of structural rigidity or integrity for it to maintain the required shape and support the porous element within it regardless of orientation of the vapor provision system.

For either folded or tubular (rolled) heaters, the planar element is to be made from an electrically conductive material, with adequate resistance to enable heating by either induction effects via induced eddy currents or the direct supply of electrical current through the heater. The planar element is a sheet, and may therefore be a sheet of a metallic material, where suitable metals include mild steel, ferritic stainless steel, aluminium, nickel, nichrome (nickel chrome alloy), and alloys of these materials. Also, the sheet may be laminate of layers of two or more materials. The sheet thickness should be thin enough to allow the curved shape to be formed to make the heater without the requirement for excessive force, and thick enough to hold the curved shape once it has been formed without reversion of the planar element back to a flat sheet, and to hold any induced bias such as the tendency for a folded heater to spring apart at the minor edges or the tendency of a rolled heater to resume its original circumference after a forced increase. Also, it may be necessary to balance the sheet thickness that meets these requirements with the need to provide a sufficient volume of resistive material to provide sufficient heating (recalling that in some examples the amount of material is reduced by perforations). Accordingly, the thickness of the planar element may be in the range of about 10 μm to about 70 μm, for example about 20 μm to about 50 μm, or about 30 μm to about 40 μm. These values may be the total thickness of the sheet including any supporting elements or coatings. If the thickness is insufficient, the heater may lack adequate structural integrity, although this may be compensated using additional materials of components. Suitable thicknesses may vary between different implementations, for example for a folded format and a tubular format.

As noted, a heater in accordance with the disclosure may be a susceptor for induction heating, as described with regard to cartomizers shown in FIGS. 2 to 6. For induction heating, no electrical connections to the heater are needed. Alternatively, a heater as described can be used as part of an atomizer that operates via Joule or ohmic heating, in which case electrical connections to the heater need to be made to enable the flow of electric current through the heater. In either case, the atomizer formed from the heater can be supported by mounting in a socket formation as described above, or by other means, and the mounting may or may not support the heater in a cantilevered fashion.

In conclusion, in order to address various issues and advance the art, this disclosure shows by way of illustration various embodiments in which the disclosed embodiments may be practiced. The advantages and features of the disclosure are of a representative sample of embodiments only, and are not exhaustive or exclusive. They are presented only to assist in understanding and to teach the disclosed embodiments. It is to be understood that advantages, embodiments, examples, functions, features, structures, or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein. The disclosure may include other embodiments not presently claimed, but which may be claimed in future.

The invention claimed is:

1. An atomizer for an electronic vapor provision system, comprising a heater for vaporizing aerosolizable substrate material and a portion of porous material for wicking aerosolizable substrate material to the heater, the heater having an elongate format and formed from a planar element of electrically resistive material having a length, a width, and two pairs of opposite edges comprising two major edges substantially parallel to the length and two minor edges substantially parallel to the width, wherein the planar element is curved to form the elongate format of the heater such that the edges of one of the pairs of opposite edges are located adjacent one another and the curved planar element defines a volume, the portion of porous material accommodated in the volume, wherein the planar element is curved around an axis substantially parallel to the length such that the two major edges are located adjacent one another to form a heater with a substantially tubular format, and wherein the planar element additionally comprises an end portion, the end portion extending from one of said minor edges, and folded with respect to that minor edge to at least partially cover an end of the tubular format of the heater.

2. The atomizer according to claim 1, wherein the two major edges are located so that major edge portions of the planar element overlap one another to form a heater with a tubular format closed along a length of the heater.

3. The atomizer according to claim 2, wherein the overlapping major edge portions are able to slide over one another to alter the capacity of the volume.

4. The atomizer according to claim 2, wherein the overlapping major edge portions are joined to one another to form a volume of fixed capacity.

5. The atomizer according to claim 1, wherein the two major edges are located with an intervening gap to form a heater with a tubular format open along a length of the heater.

6. The atomizer according to claim 1, wherein the tubular format has a substantially circular cross-section in a plane parallel to the minor edges.

7. The atomizer according to claim 1, wherein the length of the planar element is L1 and the width of the planar element is L2, and the ratio L1:L2 is substantially in the range of 4:1 to 12:1, or 2:π to 6:π.

8. The atomizer according to claim 1, wherein the elongate format of the heater has a length $L_H$ and a width $W_H$ such that the ratio $L_H:W_H$ is substantially in the range of 2:1 to 6:1.

9. The atomizer according to claim 1, wherein the electrically resistive material is metallic.

10. The atomizer according to claim 9, wherein the electrically resistive material is one of mild steel, ferritic stainless steel, aluminum, nickel, nichrome, or an alloy of these materials.

11. The atomizer according to claim 1, wherein the planar element has a plurality of perforations in it.

12. The atomizer according to claim 11, wherein the plurality of perforations are for the passage of vaporized aerosolizable substrate material out of the volume.

13. The atomizer according to claim 12, wherein the plurality of perforations are distributed over all or most of the area of the planar element.

14. The atomizer according to claim 11, wherein the plurality of perforations comprises a line or lines of perforations substantially parallel to the width of the planar element to reduce transfer of heat in the material of the planar element across the line or lines of perforations.

15. The atomizer according to claim 1, wherein the heater is a susceptor configured to be placed in an oscillating magnetic field to be heated by induction.

16. The atomizer according to claim 1, wherein the heater is configured as a resistive heating element for the flow of electrical current to be heated by Joule heating.

17. The atomizer according to claim 1, wherein the porous material comprises cotton or organic cotton.

18. The atomizer according to claim 1, wherein the porous material comprises a rod of porous ceramic.

19. The atomizer according to claim 1, further comprising a support member having a support portion defining a socket into which one or both minor edges of the planar element are inserted such that the heater is supported at one end of the elongate format only in a cantilevered arrangement.

20. An electronic vapor provision system comprising the atomizer according to claim 1.

* * * * *